(No Model.)

S. LORD.
Baker's Oven.

No. 229,539.                    Patented July 6, 1880.

Witnesses:  
W. B. Masson  
E. E. Masson

Inventor:  
Samuel Lord  
by Lewis Abraham attorney

UNITED STATES PATENT OFFICE.

SAMUEL LORD, OF NEW YORK, N. Y.

BAKER'S OVEN.

SPECIFICATION forming part of Letters Patent No. 229,539, dated July 6, 1880.

Application filed April 8, 1880. (No model.)

*To all whom it may concern:*

Be it known that I, SAMUEL LORD, a subject of the Emperor of Austria, residing at the city of New York, in the county and State of New York, have invented a new and useful Improvement in Bake-Ovens, of which the following is a specification.

The object of my invention is to provide a bake-oven of a novel construction that, by its peculiar means for the distribution and regulation of heat, shall accomplish the baking of bread and other articles of food all at the same time with required rapidity and uniformity.

My invention further provides for the heating of either the top, central part, or bottom of an oven, separately or together, at one degree or varied degrees of temperature. I accomplish this object by constructing a series of horizontal flues passing above and below isolated tiers of ovens having registers and dampers, all constructed and arranged as hereinafter described.

My device also contemplates the presentation of a larger surface for the operation of the workman than is afforded by ovens as ordinarily constructed, with which view I make my oven double-ended, so that access can be had to each tier and the divisions of each tier from opposite sides; and my invention further contemplates not only the opening up and shutting off the flow of heat to and from each tier of ovens and their several subdivisions, but the complete isolation of the several compartments of which each tier is composed. This is effected by partitions closed by separate doors and the grouping together of several of the subdivisions on each tier and the closing of each group with supplementary doors covering and overlapping the several doors in the group of subdivisions.

To enable others skilled in the art to construct and use my invention, I will now proceed to describe the same.

Figure 1:
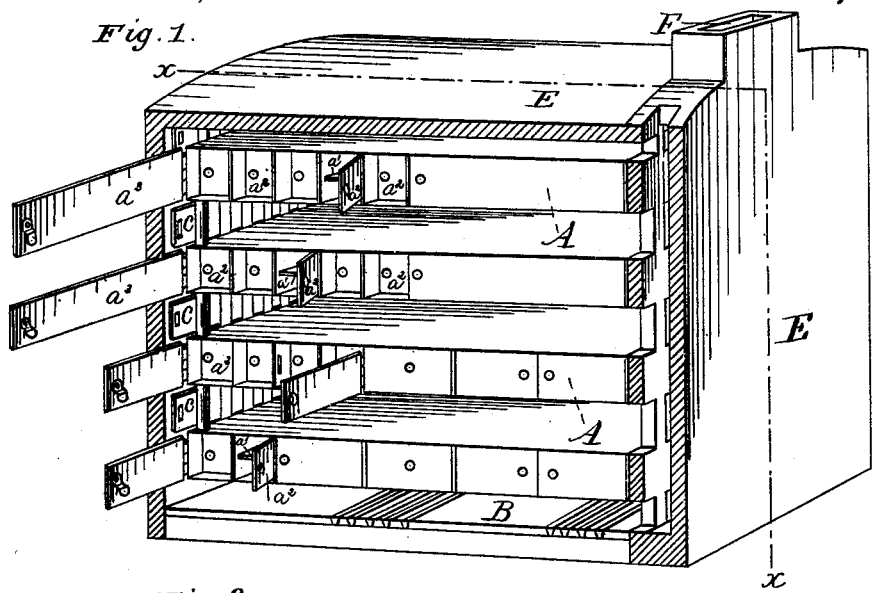
Figure 2:
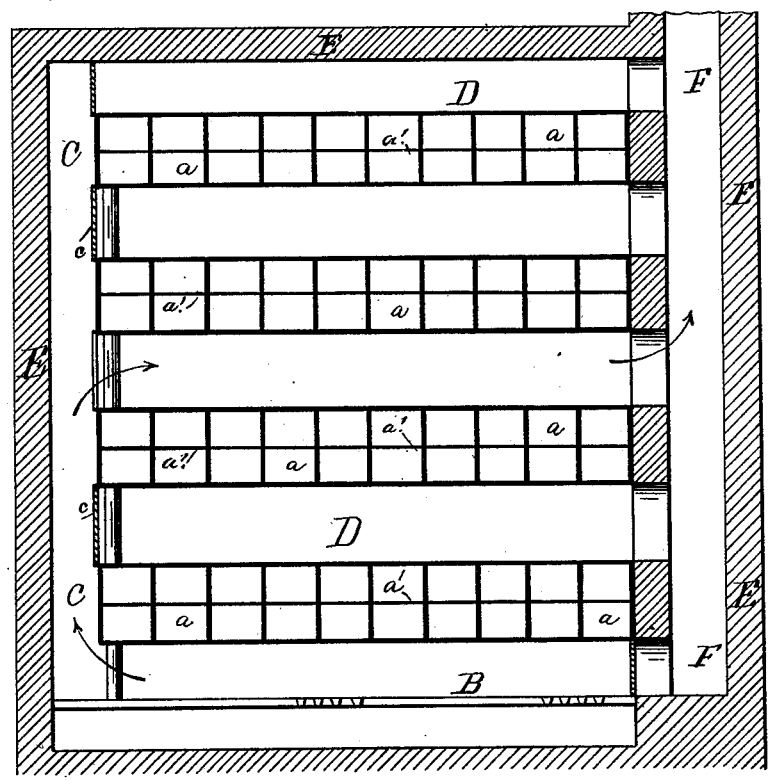

In the accompanying drawings, Figure 1 is an isometric view of my improved baker's oven, showing its subdivisions, with doors and other parts. Fig. 2 is a sectional view thereof at the line $x\ x$.

Similar letters of reference indicate like parts on each figure.

The main or outer walls and crown E E are intended to be of brick or masonry, into which the ends of the respective tiers are embedded a required distance.

The whole oven is preferably made of a rectangular shape with the crown slightly arched. It has the usual furnace B, with grate and ash-pan of any convenient construction.

Above the fire-chamber is a series of ovens, A, arranged above one another from end to end. Between these tiers are a series of flues or caliducts, D, which pass entirely above and below the whole surface of each of the tiers of ovens, one being under the crown, as shown in Fig. 1. These shelves or tiers of ovens are divided into compartments of convenient dimensions, as shown at $a$, Fig. 2, and each compartment may be again subdivided into sections by interior shelves, as shown at $a'$, and all of the tiers are again divided into two lengths each by a central vertical partition. This central partition serves as a back for what may be called the "rear" and "front" ends. Every division at each side end has a door, $a^2$, Fig. 1, by which it can be separately opened and closed without exposing the contents of any other compartment. These divisions are grouped together into convenient lengths, the groups being supplied with additional exterior doors, $a^3$, which cover up the several smaller doors of the several original divisions making the group. By this means perfect control is obtained not only of the heat in the several groups, but of each component division embraced in the respective group.

The heat from the furnace passes first under the lowermost tier of ovens, and is from thence transmitted into a perpendicular flue, C, which can be located on either side of the ovens. Horizontal branch flues or caliducts D intersect the flue C, passing both above and below each tier of ovens, making a series of alternate ovens, A, and caliducts D. The flue C, where it intersects the caliducts D, has dampers $c$, which can be each independently opened and closed, and by which means any one or more of the flues D can be supplied with a required flow of heat.

E is a hollow wall having a stack, F, into which each of the flues D opens. These flues D have each also dampers at their ends, which open into the stack F, similar to the dampers $c$ on the flues C, by which means the escape of heat into the stack F is perfectly controlled.

Fig. 1 shows only one of the ends of my improved oven. The reverse is substantially the same, the partitioned tiers of ovens extending from one front end to the other, it being a part of my invention to provide a device so that baking can go on at both sides at the same time, each tier being divided into compartments through and through. In other words, the tiers of ovens A, with their divisions $a$, extend entirely from one side to the other, being only subdivided centrally with a cross-partition, and are supplied with like devices for opening and closing at either end. In like manner do the flues D extend all the distance completely under each respective tier and completely over the uppermost one under the crown.

Except the cross-partition, there is practically no back to the respective ovens. Thus the whole surface can be equally and uniformly heated, which cannot be done in ordinary ovens.

By having my oven constructed double-ended, as described, it will readily be seen that the operation of baking can be followed with more facility than if there were only one side or front to which the workman could gain access.

It will also be seen that by my devices for shutting the heat on or off from each flue D, independently, either wholly or partially, several kinds of baking can be progressing at the same time in each tier or subdivision of a tier, for it is obvious a fierce heat can be made to flow under and above some parts and a less intense one under others.

By means of the subdivisions $a$ of the several tiers, each one closed by a separate door, $a^2$, and then again by having groups of these subdivisions $a$ also inclosed by a supplementary door, $a^3$, I not only prevent the escape of heat which occurs when an unpartitioned oven is opened, but I keep the exhalations and effluvia from each batch away from each other one. Thus I am enabled to bake at the same time bread, cakes, meat, pastry, and every description of food by means of my subdivided ovens without the respective materials being affected by any foreign or objectionable flavor.

Having now fully described my invention, what I claim, and desire to secure by Letters Patent, is—

1. A baker's oven having tiers A, each tier divided into compartments $a$, supplied with doors $a^2$, and arranged in independent groups of compartments inclosed with exterior doors, $a^3$, substantially as described.

2. In a baker's oven, the alternate tiers A, subdivided into compartments, and horizontal flues D, supplied with dampers and registers, in combination with the perpendicular flue C, having registers $c$, substantially as described.

3. A double-ended baker's oven having openings and doors at two ends, arranged, as described, so that access can be had to two opposite sides of one or more tiers of ovens, in combination with a perpendicular flue, C, and independent horizontal flues D, having registers and dampers, located substantially as set forth, so that any one or more of a series of subdivisions can be heated at a varied degree of temperature without affecting any other of the subdivisions or compartments, all constructed and arranged substantially as described, for the purpose intended.

SAMUEL LORD.

In presence of—
S. WOLF,
CHARLES HERZBERG.